United States Patent [19]

Kim et al.

[11] Patent Number: 4,559,312

[45] Date of Patent: Dec. 17, 1985

[54] SINTERING OR REACTION SINTERING PROCESS FOR CERAMIC OR REFRACTORY MATERIALS USING PLASMA ARC GASES

[75] Inventors: Jonathan J. Kim, Williamsville; Viswanathan Venkateswaran, Grand Island, both of N.Y.

[73] Assignee: Kennecott Corporation, Cleveland, Ohio

[21] Appl. No.: 533,596

[22] Filed: Sep. 19, 1983

[51] Int. Cl.[4] .............................................. F27B 9/10
[52] U.S. Cl. .......................................... 501/1; 264/64; 264/65; 423/344; 501/92
[58] Field of Search ................... 264/65, 64; 423/344; 501/1

[56] References Cited

U.S. PATENT DOCUMENTS

| | | | |
|---|---|---|---|
| 658,723 | 9/1900 | Naef | 423/423 |
| 1,516,642 | 11/1924 | Owen | 431/64 |
| 2,020,506 | 11/1935 | Jewett | 260/108 |
| 2,173,546 | 9/1939 | Bowers | 23/269 |
| 2,188,133 | 1/1940 | Hepburn | 126/91 |
| 2,387,246 | 6/1942 | Hess | 158/99 |
| 2,700,380 | 1/1955 | Knight | 126/91 |
| 2,729,542 | 1/1956 | Van der Pyl | 23/208 |
| 2,946,510 | 7/1960 | Galvin | 237/70 |
| 3,039,753 | 6/1962 | Eketorp et al. | 263/33 |
| 3,128,756 | 4/1964 | Galvin | 126/116 |
| 3,243,612 | 3/1966 | Lyczko | 310/4 |
| 3,285,240 | 11/1966 | Schmidt | 126/91 |
| 3,348,915 | 10/1967 | Watson et al. | 23/204 |
| 3,353,528 | 11/1967 | Robinson | 126/91 |
| 3,355,252 | 11/1967 | Bliek | 23/253 |
| 3,432,296 | 3/1969 | McKinnon et al. | 75/214 |
| 3,608,505 | 9/1971 | Rosenberg et al. | 431/238 |
| 3,688,760 | 9/1972 | Rudin | 126/91 |
| 3,935,371 | 1/1976 | Camacho et al. | 13/2 |
| 3,946,719 | 3/1976 | Bark et al. | 431/353 |
| 4,162,167 | 7/1979 | Enomoto et al. | 423/345 |
| 4,179,299 | 12/1979 | Coppola et al. | 106/44 |

FOREIGN PATENT DOCUMENTS 2165172 7/1972 Fed. Rep. of Germany .
488296 7/1938 United Kingdom .

OTHER PUBLICATIONS

Baumann, "The Relationship of Alpha and Beta Silicon Carbide," *The Journal of the Electrochemical Society*, 1952, pp. 109-114.

*Primary Examiner*—James Derrington
*Attorney, Agent, or Firm*—Pahl, Lorusso & Loud

[57] ABSTRACT

A process for sintering or reaction sintering ceramic or refractory materials with hot plasma gases. The hot plasma gases are produced by injecting a combined primary plasma arc with a secondary gas stream directly into a reaction furnace. The secondary gas stream is tangentially injected into the primary plasma arc gas stream to mix the gases for the required sintering temperature at the highest energy efficiency. The plasma torches are positioned in the furnace ports so that the plasma gas flow is perpendicular to the furnace process gas flow. This process is inexpensive and efficient and results in a superior quality sintered product. It may be adapted to continuous or periodic kilns to achieve a high furnace productivity.

8 Claims, 4 Drawing Figures

SINTERING OR REACTION SINTERING PROCESS FOR CERAMIC OR REFRACTORY MATERIALS USING PLASMA ARC GASES

BACKGROUND OF THE INVENTION

This invention relates to a process for sintering or reaction sintering ceramic or refractory materials using plasma heated gases.

In practice, many ceramic or refractory materials, such as those consisting of alumina and silica, are sintered in tunnel or periodic kilns which are fired by energy released from the combustion of fossil fuels with air or oxygen. If the ceramic or refractory material can be exposed to air and/or the products of combustion, then the kiln may be directly fired, in which case, the heating and utilization of energy may be reasonably efficient. However, for certain ceramic materials, such as the carbides, nitrides and borides, the firing must be done in the absence of oxygen or oxygen-bearing gases, including water and carbon dioxide, to prevent formation of oxides, which may have undesirable physical or chemical properties. Under such conditions, fossil fuel-fired furnaces may be used but the ceramic or refractory materials must be kept in a controlled environment isolated from the combustion products of the fuel. Because the ceramic or refractory materials must be heated in a retort, the heating is indirect, inefficient and slow. On a commercial scale such a process, using a tunnel kiln, for example, requires about 70–90 hours (including the cooling cycle).

Electric kilns are also used to sinter ceramic or refractory materials under controlled atmospheres, but also tend to be energy inefficient and slow. In the case of a kiln equipped with heating elements such as graphite electrodes, the voltage can be controlled and the kiln can be heated to fairly high temperatures, yet there are several disadvantages: (1) The heating elements have a limited size, complex shape and must be kept under a strictly controlled atmosphere to maintain a long life; and, (2) Furnace size is limited and it is difficult to achieve a uniform temperature in this type of kiln because only the heating elements are the source of the radiant heat. Because of this radiant heat transfer, as well as a size limit for heating elements, the kiln has a limited productivity and a poor energy efficiency.

Conventional processes, in general, require long retention times resulting in poor energy utilization, excessive furnace gas consumption and high maintenance costs.

In the sintering or reaction sintering of ceramic or refractory materials, the required reaction temperature of the furnace is usually less than 2500° C. However, the average temperature of gases heated through a plasma arc column is above 7000° C.; thus, plasma technology has previously been applied only to fusion of high temperature materials and not to sintering or reaction sintering. In order to use plasma heated gases at a lower furnace temperature, they can be mixed with secondary gases. Prior art plasma systems for mixing plasma heated gases and secondary gases generally employ radial injection of the secondary gases into the plasma gas and single rather than multiple plasma torches. In a furnace disclosed in U.S. Pat. No. 3,935,371 by Camacho et al. entitled "Plasma Heated Batch-Type Annealing Furnace", the plasma torch and reactant gas inlet are positioned on the bottom of the furnace and flow in the same direction.

SUMMARY OF THE INVENTION

The present invention relates to a sintering process for ceramic or refractory materials comprising tangentially injecting a secondary gas stream into a plasma arc gas stream; and, the resulting hot plasma gas is fired directly through a furnace injection port.

In accordance with the process of the present invention, when the secondary gas stream is injected tangentially into the plasma arc stream, a swirl effect is created wherein the cold gas surrounds the hot plasma core, resulting in improved energy efficiency.

Preferably, in accordance with the present invention, more than one plasma torch is used and they are positioned asymmetrically through ports in the furnace. For the same amount of power, two torches are more efficient than a single torch in creating the maximum turbulence inside the furnace.

A plasma arc system, in accordance with the present invention, may be retrofitted to conventional furnaces, or to a furnace which has been specifically constructed for plasma gases. The plasma arc system of the present invention may be used in either continuous or periodic (batch) processes. In a preferred form of the present invention, using a continuous process, several sets of plasma arc torches are positioned along the heating zone and the soaking zone. To create maximum turbulence within the furnace, the mixed plasma and secondary gas streams are injected perpendicularly to or slightly countercurrent to the process gas stream flow.

Use of plasma arc torches, in accordance with the process of the present invention, results in increased reaction rates because of a higher heat transfer; and from an increased chemical reactivity when the sintering involves reaction of the plasma gas with the ceramic or refractory materials. Higher reaction rates result in higher energy efficiencies, lower retention times, and higher kiln productivities. In addition, a superior corrosion-resistant product is produced by the process of the present invention.

Accordingly, it is an object of the present invention to provide a process for sintering ceramic or refractory materials which is inexpensive, efficient, and can be applied to continuous or periodic kilns.

It is a further object of the present invention to provide a process for sintering ceramic or refractory materials which, because of good convective heat transfer throughout the entire furnace, achieves high kiln productivity, a uniform temperature distribution in the kiln, and a significant reduction of the retention time required for ceramic or refractory materials.

It is yet another object of this invention to provide a process for sintering ceramic or refractory materials which results in a simple kiln design, with good reliability and control of the furnace.

It is yet a further object of the present invention to provide a process for sintering ceramic or refractory materials which results in consistent, uniform and superior quality products.

It is a further object of this invention to provide a process for mixing plasma gases that has a decreased energy loss to cooling water, prevents hydrodynamic interference of the secondary gas stream with the primary plasma arc column gas stream, and results in improved energy efficiency.

Other objects and further scope of applicability of the present invention will become apparent from the detailed description to follow, taken in conjunction with the accompanying drawing.

DESCRIPTION OF THE PREFERRED EMBODIMENT

This invention relates to a process for sintering or reaction sintering ceramic or refractory materials in which the improvement is connected with the injection of a plasma gas combined with a secondary gas stream, from at least two plasma arc torches, directly into at least two gas ports of a furnace. The invention includes tangential injection of the secondary gas into the plasma gas within the torch. The torch with these combined gases is positioned through ports to cause the combined gases to flow in a direction which is perpendicular to the process gas flow.

The invention may be used to great advantage in practicing the process set forth in U.S. patent application Ser. No. 403,938 filed Aug. 2, 1982 now abandoned, entitled "A Sintering Process for Refractory Articles Using Direct-Heated Gases," the teachings of which are incorporated herein by reference.

Plasma arc fired gases differ greatly from ordinary furnace heated gases in that they contain electrically charged particles capable of transferring electricity and heat, and become ionized; or as in the case of nitrogen, become dissociated and highly reactive. These phenomena greatly increase the reaction rates for bonding ceramic or refractory materials. Nitrogen, for example, which dissociates at around 5000° C. and 1 atmosphere pressure, would not dissociate under the normal furnace sintering conditions of around 1500° C.-2000° C. Even if a furnace could reach the high dissociation temperature of nitrogen, it would be undesirable for the ceramic or refractory materials to be at this high temperature because bonds or materials might decompose. Thus, a plasma gas can be superheated to effect ionization or dissociation, while the ceramic or refractory materials can be directly heated by this preheated gas to a much lower temperature. Nitrogen plasma gas dissociates into a highly reactive mixture of $N_2$-molecules, N-atoms, $N^+$-ions and electrons. Argon, on the other hand, ionizes rather than dissociates when used with a plasma arc. Any plasma gas may be used in accordance with the present invention, depending upon sintering requirements.

Use of plasma arc torches increases the reaction rate because of a higher heat tranfer rate, in addition to increasing the chemical reactivity as in the case of using nitrogen plasma gas for a nitriding reaction. An increased reaction rate results in a lower retention time in the furnace and a higher kiln productivity. Processing in accordance with the present invention requires only about one-fifth of the time required for conventional processing.

The average temperature of gases heated through a plasma arc column or torch is above 7000° C., whereas the average operating temperature of a sintering furnace is around 1500° C.-2500° C. Thus, blending a plasma arc gas stream with a secondary gas stream is required to achieve the lower sintering temperatures.

Figure 1:
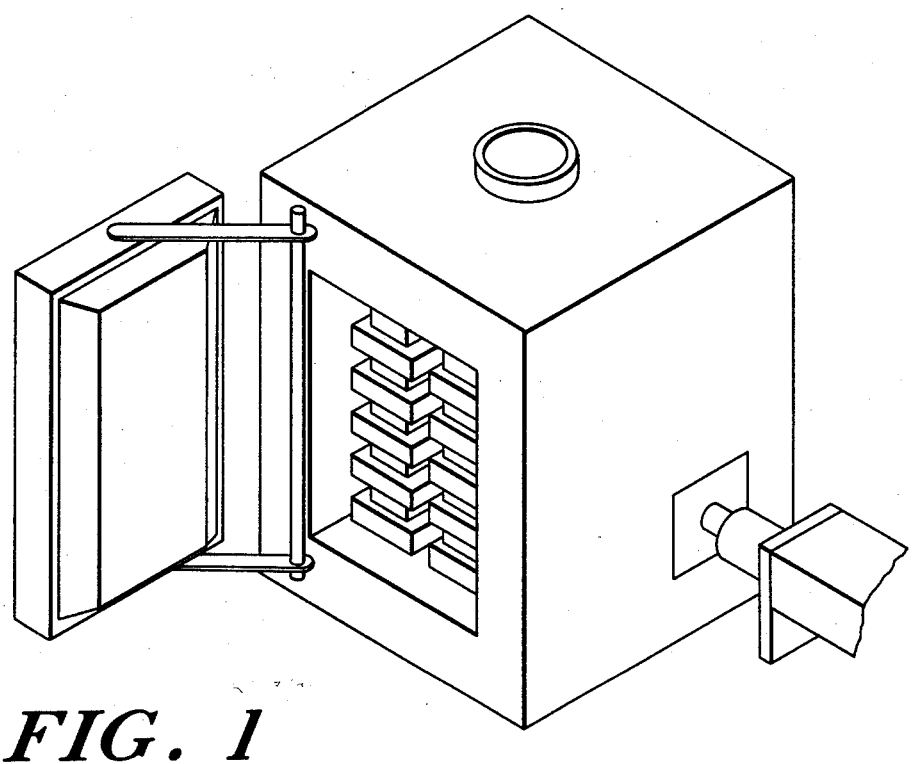
FIG. 1 is a perspective view of a plasma gas fired batch furnace.
Figure 2:
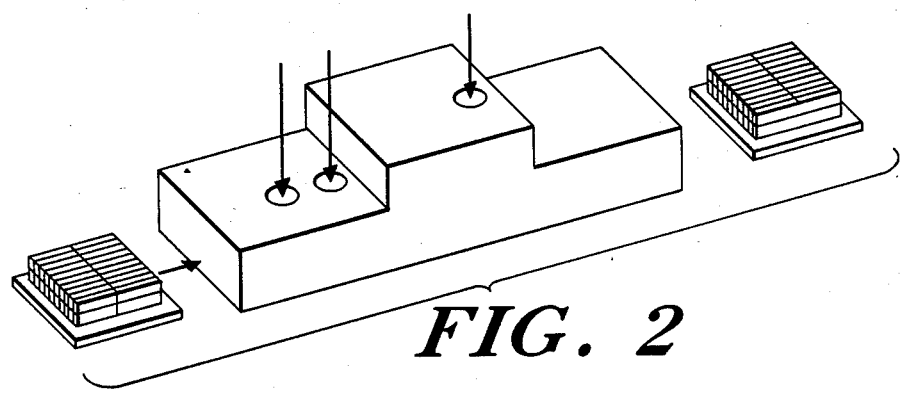
FIG. 2 is a perspective view of a plasma gas fired continuous furance.
Figure 3:
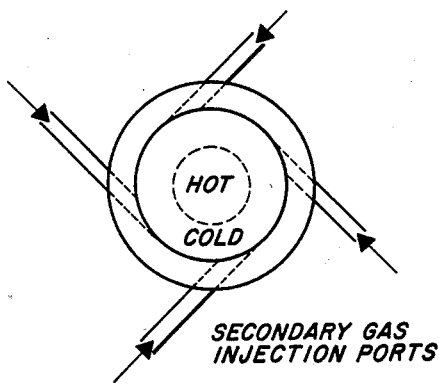
FIGS. 3 and 4 are diagrams showing the effect of tangential injection of a secondary gas.
Figure 4:
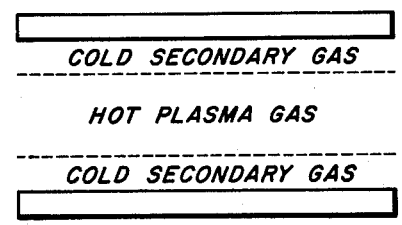

FIG. 1 shows schematically a plasma gas fired batch type furnace. In this the two plasma torches are located one in front and one in rear to create maximum turbulence. In a continuous furnace the hot plasma gas will be introduced in the heating and reaction zones, as shown in FIG. 2. In this furnace the solids move counter-current to gas flow. FIGS. 3 and 4 show the tangential injection of the secondary gas in the water cooled mixing chamber. This results in the hot plasma gas in the core being shielded by the secondary cooler gas thereby improving energy efficiency.

In accordance with the present invention, the injection of a secondary gas into the plasma arc gas stream, in a tangential fashion as shown in FIG. 3, provides the best mixing of the two gas streams. Tangential injection of the secondary gas stream together with an existing pressure drop creates a swirl effect wherein the cold gas envelops the hot plasma core. FIG. 3 shows the secondary gas stream being injected into four sites; however, more than four or fewer than four sites may be utilized to create the swirl effect.

This tangential design of the present invention yields higher efficiencies when compared to radial injection. Almost all of the mixing of the two streams takes place as the gases leave the torch and enter the furnace. Improved energy efficiency results from the cold gas stream enveloping the hot plasma core stream inside the torch chamber, thus preventing hydrodynamic interference of the secondary gas stream with the plasma arc gas stream.

In the preferred form of this invention, more than one plasma torch is used and they are positioned asymmetrically through ports in the furnace to create a uniform temperature distribution and maximum turbulence in the furnace for convective heat transfer. For the same amount of power, two torches or more are more effective than a single torch. In the case of two plasma torches positioned through ports in a rectangular-shaped furnace, for example, one torch could be positioned at the lower front left side of the furnace, and the other plasma torch could be positioned at the lower back right side of the furnace, to achieve this asymmetric positioning. In the case of a continuous tunnel kiln, two sets of plasma torches could be asymmetrically positioned; one set along the heating zone, and one set along the soaking zone.

Plasma arc systems in accordance with the present invention may be fitted to conventional periodic (batch) kilns or continuous kilns, such as tunnel or push-type kilns. Thus, the process of the present invention may be operated as either a batch process or as a continuous process. The furnace used in accordance with the present invention may be specifically constructed for the purpose of the present invention, or as noted above, may be any conventional furnace including batch and continuous type furnaces, modified by using plasma arc torches instead of fuel burners or electrodes.

In a preferred form of this invention, using a continuous process, dried green ceramic or refractory materials continuously enter a gas tight kiln from a purging chamber. A car or setter plate travels through heating, soaking and cooling zones at a constant speed. The kiln is operated with a hermetic seal. Plasma gas at a given volumetric rate, is flowed perpendicular to the product movement and process gas stream. Plasma torches located at the heating and soaking zones inject plasma gas at high temperatures into the kiln depending on energy requirements. Heated plasma gases enter the preheat zone and heat the incoming green ceramic or refractory materials. The exit plasma gas temperature is controlled to entrain most of the volatile matters into a condenser or a scrubber. Cleaned gas is then recycled to the kiln.

The invention is further illustrated by the following non-limiting examples in which silicon carbide (Refrax 20 ®) was formed into green refractory bricks and placed into a furnace for sintering by the reaction of free elemental silicon in the bricks with plasma nitrogen gas to form silicon nitride ($Si_3N_4$) bonds. The temperature of the plasma heated nitrogen was at 3000°-3500° C. and the heating rate was 250°-350° C./hr.

The inner dimensions of the furnace were 24"×22"×18", making a total working volume of 5.5 ft$^3$. The furnace had an interior lining of 1" thick silicon carbide tile, Carbofrax ®, to withstand severe thermal cycles as well as a silicon atmosphere. The tile was backed by 2 inches of Saffil ® blanket, 3 inches of Fiberfrax ® (8 lbs/ft$^3$) and 2 inches of Fiberfrax ® (6 lbs/ft$^3$) in succession. Structural rigidity of the furnace was provided by a 3/16" steel plate enclosure. An exhaust hole having a 4"-diameter opening was located on the top face of the furnace.

Two laboratory, modular torches were used. The torches were rated at 50 kw of power with water-cooled cathode and anodes. The cathode was made of tungsten and had a sharp pointed tip. The anode consited of five individual segments made of copper. These anode segments had fine channels for water cooling. O-rings near the periphery helped to hermetically seal the segments. Critical adjustment of the cathode to the starting anode segment was necessary to keep a stable plasma flow. This accurate adjustment of the cathode-anode was provided by three micrometers in the cathode housing. During normal operation, the first segment was used as a starter and was electrically isolated from the other segments, whereas the other four segments were electrically shorted by placing brass shims between the segments.

Each plasma torch was attached at a torch mount assembly which could be detached from the main furnace structural body. Special insulation was provided in the torch mount assembly to safely accommodate the high temperature of the plasma torch. Castable fused aluminum oxide bubble refractory was used for the inner lining of the torch mount assembly. As a safety measure, a provision was also made to water cool the shell of the torch mount assembly. Water cooling, however, was found to be unnecessary for the operation of the plasma torches at 3500° C. or less.

Two nitrogen inlets were provided to each plasma torch; the first inlet acting as the primary plasma source and the second inlet used to dilute the primary stream to obtain the desired temperature of nitrogen. During normal operation, the primary nitrogen stream was supplied at 50-100 psi and the secondary nitrogen stream was supplied at 10 psi. When both torches were operating at peak power, the total nitrogen requirement was around 6 SCFM for the primary stream and around 20 SCFM for the secondary stream. Higher flow rates of around 40-50 SCFM were used during cooling.

The injection of secondary nitrogen for controlling the temperature of the inlet plasma nitrogen gas was carried out in a water-cooled cylindrical chamber, attached in front of the primary anode segments. The cold nitrogen was introduced in a tangential fashion at four points along the circumference of the cylindrical chamber.

A water supply of 7-10 gpm was used for cooling the electrodes of the plasma torch. Because of the presence of a large pressure drop within the plasma torch cooling system, it was necessary to boost the supply pressure sufficiently. A booster pump was installed to take care of this problem and had a capacity of delivering 15 gpm of water at 150 psi. A filtering unit with a 100 micron filter was installed to filter the cooling water.

A provision was made for an on-line supply of nitrogen gas from a liquid nitrogen tank. The nitrogen gas used in the plasma furnace was not recycled for simplicity of pilot operation.

The power supply to the torches was provided by four Miller welding units; two for each plasma torch. The two units were connected in parallel; each unit was rated at 40 kw of power (80 V at 500 A). The high impedance of this power supply helped in stabilizing the single phase plasma arc.

STACKING ARRANGEMENT EXAMPLES 1-10

Experiments were conducted to determine the heat transfer characterization. Heat was transferred from hot inlet gas to cold bricks in a counter current heat exchanger arrangement. The load consisted of 432 pounds of fired Refrax-20 ® bricks. Temperatures were measured at inlet and outlet ends to obtain heat tranfer rates by a calculation of logarithmic mean temperature difference. The time interval used in the calculation was 1 hour. Variables investigated were number of plasma torches (1-2), inlet gas temperature (2000° C., 3000° and 3500°), inlet gas volume (58-148 lbs/hr), and dense and open stacking patterns. Results are shown in Table 1. Table 1 lists the number of plasma torches, gas inlet temperature, packing arrangement, gas flow rate, and average heat transfer coefficient.

TABLE 1

SUMMARY OF MEASURED OVERALL HEAT TRANSFER COEFFICIENTS

| Ex. | Number of Torches | Inlet Gas Temp. (°C.) | Packing | Flow Rate (SCFM) | Heat Transfer Coefficient (Btu/hr. °F.) |
|---|---|---|---|---|---|
| 1 | 2 | 2000 | Dense-Closed | 14.6 | 2.77 |
| 2 | 2 | 3000 | Dense-Closed | 12.4 | 3.08 |
| 3 | 2 | 3500 | Dense-Closed | 12.0 | 2.93 |
| 4 | 2 | 2000 | Dense-Closed | 24.0 | 4.68 |
| 5 | 2 | 2000 | Dense-Closed | 30.2 | 5.78 |
| 6 | 1 | 2000 | Dense-Closed | 14.5 | 2.17 |
| 7 | 2 | 2000 | Dense-Open | 23.6 | 5.15 |
| 8 | 2 | 3000 | Dense-Open | 14.1 | 3.71 |
| 9 | 2 | 2000 | Dense-Open | 31.5 | 6.18 |
| 10 | 2 | 2000 | Light-Open | 28.3 | 5.17 |

(1) Overall heat transfer coefficient depended on the gas flow rate and packing arrangement.

(2) For a given stacking arrangement higher gas flow results in higher overall heat transfer coefficient.

(3) For a given flow rate and density of stacking arrangement open setting results in improved heat transfer rates.

(4) For a given flow rate and brick arrangement, two torches are more efficient than a single torch.

EXAMPLES 11-19

Experiments to determine the energy conversion efficiency of the plasma torch were conducted with radial and tangential injection of the secondary gas. Energy loss to cooling water was measured by measuring the flow as well as the inlet and outlet temperatures. Table 2 summarizes the power, primary and secondary gas flow rates and the efficiencies obtained for the case of tangential injection.

TABLE 2

OVERALL EFFICIENCY MEASUREMENT OF PLASMA TORCH

| Example | Power (kw) | Primary Gas (SCFM) | Secondary Gas (SCFM) | Overall Efficiency (%) |
|---|---|---|---|---|
| 11 | 20 | 2.00 | 6.69 | 63 |
| 12 | 35 | 2.00 | 13.72 | 62 |
| 13 | 45 | 2.00 | 18.20 | 59 |
| 14 | 20 | 3.00 | 1.79 | 53 |
| 15 | 35 | 3.00 | 6.96 | 65 |
| 16 | 45 | 3.00 | 9.62 | 65 |
| 17 | 20 | 3.85 | 0.00 | 46 |
| 18 | 25 | 2.60 | 3.20 | 53 |
| 19 | 45 | 3.55 | 5.20 | 59 |

(1) The overall maximum efficiency improved from 50.1 to 65.1 when switching from a radial to tangential injection.

(2) For a given primary gas flow, increase in secondary flow increases the overall efficiency up to 65%.

(3) To obtain efficiencies greater than 60% it is necessary to have a minimum of 5 SCFM of secondary gas.

EXAMPLES 20-29

Fired Refrax-20 ® bricks were randomly selected from each pilot plant test for physical (density and porosity), mechanical (cold modulus of rupture) and alkali resistance tests. A minimum of two bricks from each test was selected for this product evaluation. The density and porosity of the product was measured from test bars cut from the bricks. Modulus of rupture measurements were made on test bars using a 3-point bend test. Test bars were cut from the surface and interior portions of the brick, and were immersed in $K_2CO_3$/coke mixture at 927° C. for 6 hours to determine the alkali resistance.

TABLE 3

SUMMARY OF PRODUCT EVALUATION

| Example | Heating Rate (°C./hr) | Holding Temp (°C.) | Holding Time (Hr.) | Density g/cm$^3$ | Porosity % | MOR psi | Alkali Resistance % change in wt. |
|---|---|---|---|---|---|---|---|
| 20 | 250 | 1500 | 3.0 | 2.61 | 17.44 | 4197 | 4.75 |
| 21 | 250 | 1500 | 4.0 | 2.63 | 16.80 | 4623 | 3.96 |
| 22 | 350 | 1400 | 3.0 | 2.61 | 17.28 | 5358 | 2.91 |
| 23 | 350 | 1500 | 2.5 | 2.61 | 14.10 | 5058 | 4.97 |
| 24 | 350 | 1550 | 1.5 | 2.61 | 16.10 | 4177 | 3.95 |
| 25 | 350 | 1550 | 2.5 | 2.54 | 18.30 | 4143 | 3.43 |
| 26 | 350 | 1550 | 1.5 | 2.61 | 15.90 | 4013 | 5.05 |
| 27 | 250 | 1500 | 3.5 | 2.57 | 19.10 | 3708 | 2.89 |
| 28 | 250 | 1500 | 3.5 | 2.61 | 17.50 | 4408 | 2.45 |
| 29 | 350 | 1500 | 3.5 | 2.59 | 18.20 | 4300 | 2.13 |

The average density ranged from 2.54 to 2.63 g/cm$^3$. It was found that the fired density was more dependent on green brick preparation (mix composition, as well as press conditions) than any other factors.

Average porosity values ranged from 14.1 to 19.1%. The scatter in the porosity data also indicated that porosity is more dependent on green brick preparation.

The average modulus of rupture obtained from the individual firing tests ranged from 3708 psi to 5058 psi. In general, the product from the plasma furnace had a lower cold modulus of rupture compared to tunnel or periodic kiln products.

It was found that there was no noticeable difference in corrosion behavior (alkali resistance) between the inside and outside of the bricks. Typically, the outer portion of a tunnel or periodic kiln brick is less resistant to alkali corrosion than the interior portion, thus plasma products performed better.

Although the invention has been described with reference to these preferred embodiments, other embodiments can achieve the same results. Variations and modifications of the present invention will be obvious to those skilled in the art and it is intended to cover in the appended claims all such modifications and equivalents.

We claim:

1. A process for sintering ceramic or refractory materials wherein the improvement comprises injection of a combined primary plasma arc gas with a secondary colder gas from at least one plasma arc torch, directly into at least one gas port of a furnace, said secondary gas being injected into said plasma arc gas tangentially, thereby creating a swirl effect wherein the secondary gas surrounds the core of the primary plasma arc gas.

2. A process in accordance with claim 1 wherein the combined gas stream is injected into the furnace perpendicularly to the flow of process gases.

3. A process in accordance with claims 1 or 2 wherein the plasma arc torch is surrounded by a water cooled mixing chamber.

4. A process in accordance with claims 1 or 2 wherein there is more than one plasma torch.

5. A process in accordance with claim 4 wherein the plasma arc torches are placed through furnace gas ports which are positioned asymmetrically along the furnace.

6. A process in accordance with claims 1 or 2 wherein the furnace is a batch-type furnace.

7. A process in accordance with claims 1 or 2 wherein the furnace is a tunnel type continuous furnace.

8. A process in accordance with claims 1 or 2 wherein the furnace is a push-type continuous furnace.

* * * * *